United States Patent [19]
Jamzadeh

[11] Patent Number: 4,961,089
[45] Date of Patent: Oct. 2, 1990

[54] METHOD AND APPARATUS FOR WEB TRACKING WITH PREDICTIVE CONTROL

[75] Inventor: Fereidoon S. Jamzadeh, Rochester, N.Y.

[73] Assignee: Eastman Kodak Company, Rochester, N.Y.

[21] Appl. No.: 290,718

[22] Filed: Dec. 27, 1988

[51] Int. Cl.[5] ........................ G03G 21/00; B23Q 15/00
[52] U.S. Cl. .................................... 355/207; 355/212; 355/326; 226/21
[58] Field of Search ............... 355/205, 206, 207, 208, 355/210, 212, 218, 326, 77; 226/15, 18, 20, 21

[56] References Cited

U.S. PATENT DOCUMENTS

| | | | |
|---|---|---|---|
| 3,181,418 | 5/1965 | Durlofsky | 355/212 |
| 3,570,735 | 3/1971 | Kurz | 226/18 X |
| 4,429,985 | 2/1984 | Yokota | 355/3 BE |
| 4,462,676 | 7/1984 | Shimura et al. | 355/3 BE |
| 4,483,607 | 11/1984 | Nagayama | 355/212 |
| 4,572,417 | 2/1986 | Joseph et al. | 226/20 |

OTHER PUBLICATIONS

Patent Abstracts of Japan, abstract to Unexamined Application 63-50874 of 3/3/84 by Chiaki Daito.

*Primary Examiner*—R. L. Moses
*Attorney, Agent, or Firm*—Mark Z. Dudley

[57] ABSTRACT

Web tracking apparatus and methods are disclosed having particular utility in electrostatographic reproduction apparatus. A web includes a plurality of image frames allowing images to be written thereon and transferred therefrom to a receiver. A guide means moves such web along a path and includes a steering roller mounted for rotation about a caster axis and a gimbal axis. A web tracking system for controlling the guide means to effect lateral alignment of said web is provided such that the deviation of corresponding points of transferred images is minimized. Degradation of image registration due to mid-print corrections is eliminated and steering corrections are made less frequent by the use of adaptive and predictive algorithms. The writing and transfer of images is thereby accomplished in accurate registration and is particularly well-suited for use in forming accurate multicolor reproduction of superimposed images.

37 Claims, 7 Drawing Sheets

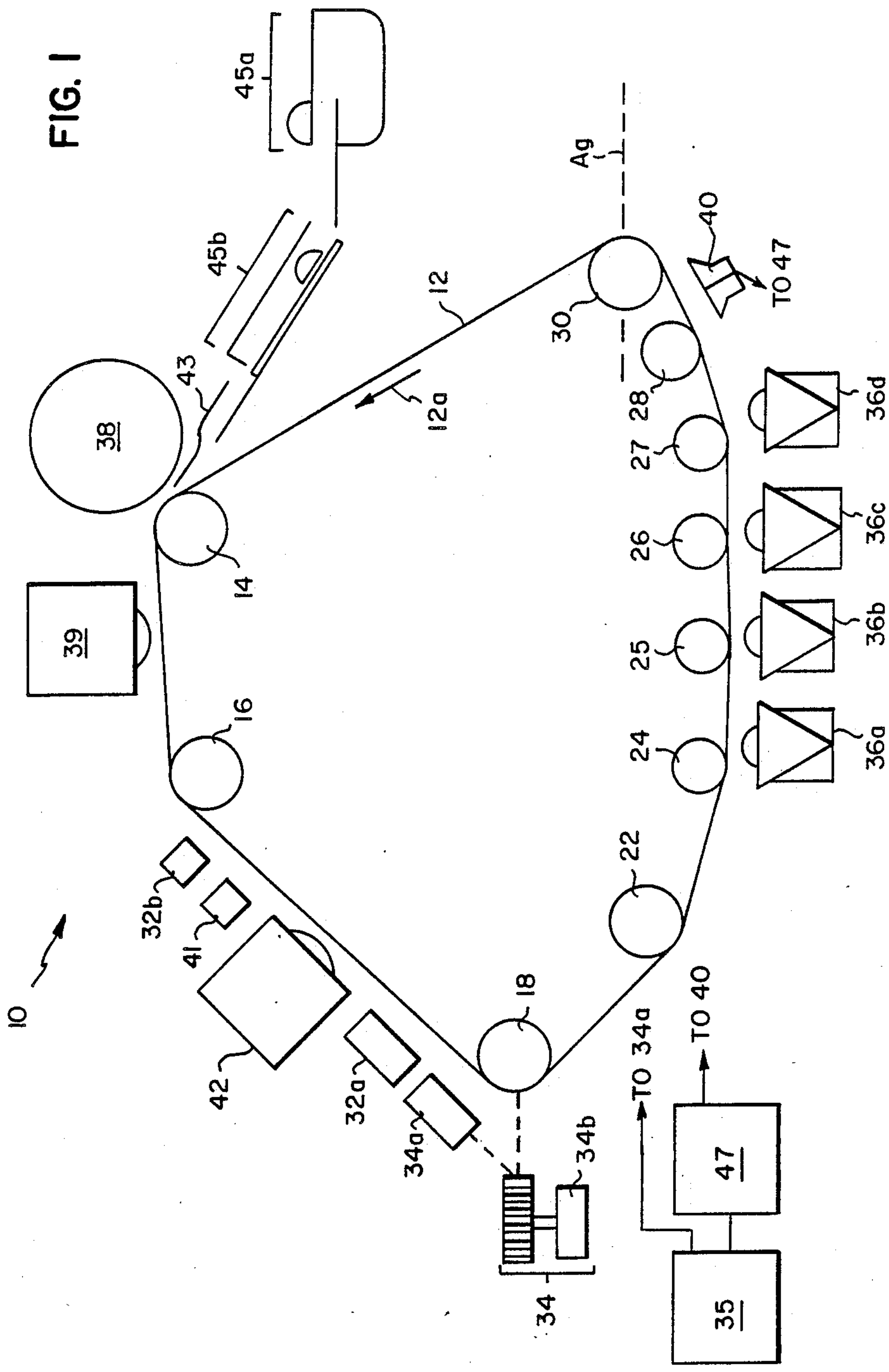
FIG. I

METHOD AND APPARATUS FOR WEB TRACKING WITH PREDICTIVE CONTROL

BACKGROUND OF THE INVENTION

1. Field of the Invention

This invention relates generally to methods and apparatus for web tracking, and more particularly to apparatus for controlling the alignment, in a lateral (cross-track) direction, of a web moving along a path in a travelling (in-track) direction.

2. Description of the Prior Art

In high speed electrostatographic reproduction apparatus, it is a common practice to employ an elongated photoconductive belt or web adapted to record transferable images while the web is moving in a path in operative relation with various process stations. Typically the web is supported by, and driven about, at least one roller. With a roller support, there is a tendency for the moving web to shift laterally, or cross-track, with respect to such roller. Various apparatus for correcting for such lateral shifting of roller-supported webs are known, such as crowned rollers, flanged rollers, servo actuated steering rollers, or self-actuated steering rollers. Crowned rollers generally are not suitable for use with a web in an electrostatographic reproduction apparatus because they force the web toward the apex of such rollers, cause distortion of the web, and produce local stresses in the web at the crown which can damage the web. Flanged rollers generally are also not suitable because they produce a concentrated loading at the edges of the web resulting in edge buckling, seam splitting, or excessive edge wear.

Electrostatographic reproduction apparatus therefore typically utilize servo-actuated or self-activated steering rollers. While such steering rollers generally correct in a gross manner the cross-track shifting of the web, they tend to produce significant lateral movement of the web at an uneven rate as it is realigned. Further, the rate of web drift is inconsistent from correction to correction. Such an uneven rate of change of the web position results in the production of image frames which do not match, or register, therebetween. Additionally, at the onset of web lateral movement during a correction, an abrupt lateral distortion or deformation of the web is experienced due to the rather large and abrupt rotation of the steering roller. The abrupt change arises in the drift reversing motion of the steering correction wherein the angular position of the roller changes with respect to the machine frame. The roller position change causes a corresponding abrupt lateral web distortion of a few thousandths of an inch.

In making monochromatic reproductions, such misregistration, within limits of course, is not problematic as only one discrete area, or image frame, of the web is used in generating any one reproduction. However, in an apparatus wherein either monochromatic (separation) or multichromatic (color copy) image reproductions are made, i.e., for composite printing, copying, or duplicating applications, there is a significant likelihood that the correction will degrade the image quality of the composite image. Hence, the inconsistency or instability of the rate of web lateral movement, or drift, following a correction becomes a significant limiting factor in obtaining quality reproductions from such an apparatus.

In the prior art, as exemplified by U.S. Pat. No. 4,429,985, a recording system is described which comprises a recording member of the endless belt form in which a series of information is recorded while the recording member is moved. A deviation sensing means senses a deviation of the recording member and a deviation correcting means corrects the deviation of the recording member. A control circuit is provided for actuating the deviation correcting means based on a signal generated by the deviation sensing means upon sensing the deviation.

As exemplified by U.S. Pat. No. 4,462,676, there is described a skew control apparatus for use in a recording apparatus, capable of detecting the skew of an endless-belt-shaped recording material, and reversing the direction of the skew during an on-recording period, even if such skew is detected during the recording operation period.

In making monochrome reproductions with an apparatus utilizing, for example, a moving charged photoconductive web, charge patterns corresponding to related color separation images are formed in successive image frames of the web. Such patterns are developed with pigmented marking particles to form transferable images. Each image is transferred sequentially to a respective receiver member whereby each image forms one of the several color separations for the multicolor reproduction. The sequential image transfer must take place in accurate register in order to obtain quality output of separations for faithful multicolor reproduction. In such color applications, transferable images generated from such successive "master" separations are aligned for accurate superimposed registration during the creation of a multicolor composite print. Alignment is typically accomplished while installing the receiver in a printing or duplicating machinery by registering the receiver edge to a respective portion of the machinery.

Therefore, during the production of such a separation or other such imaged receiver, any lateral movement, or drift, of the web during web rotation must be controlled to a uniform rate; any inconsistency in the rate of lateral movement will place successive image frames in differing positions relative to the exposure and transfer stations of the apparatus. The resulting misregistration of the image frames must be held within acceptable limits. The maximum misregistration between corresponding points of the color separations at a screen ruling of 150 lines per inch has been found to be two-thousandths of an inch for proper cross-track and in-track registration for some applications.

A further problem of known servo-actuated or self-activated steering roller tracking systems is that they react to the absolute lateral position of the edge of the web, rather than to the actual lateral position of the web. Because the web edge is typically irregular, any misregistration due to other mechanisms such as described hereinabove are worsened or compounded. Such compounding is exacerbated due to a typical increase in web edge irregularity over its operational life. The resulting detriment to the registration of the sequential transferable images causes the production of composite images which are not within the acceptable limits for accurate composite registration. In reproduction apparatus using known tracking systems, such problems force the apparatus user to initially reject many webs which would otherwise be useable, and further to replace webs too soon that otherwise could remain in use.

Moreover, there exists a need for a electrostatographic reproduction apparatus, operable for the production of monochrome and multichrome images, having a web tracking system which is continually predictive. That is, the tracking system must continually be aware of the near-future reproduction activity in the apparatus, and must plan accordingly to avoid a correction during the exposure or transfer of an image frame. The web in a typical apparatus may travel at least one revolution in order to image one or more sets of separations of a three color image. In other embodiments of such an apparatus, the web travels 3 or more revolutions in order to image one set of separations, and in some applications may transfer the separation set to a single receiver to produce a multicolor reproduction, or to a corresponding set of receiver members to produce a color separation set. Therefore, before the printing of the separations is begun, there must be certainty that the web will not reach the limits of the allowable drift during the creation of the developed image(s). If a correction is so anticipated, then the correction must be made before the image(s) are created. Otherwise, the aforementioned abrupt change of the web position in a steering correction made during an imaging exposure or transfer is likely to degrade the image to the point that the image will be unacceptable or unuseable for multicolor reproduction. Any correction applied to the web creates a lateral web distortion to some degree which propagates throughout the web path at the web transport speed and which will subside only after one full revolution, thus making mid-print corrections undesirable. Lacking the ability to predict a requisite correction, known web tracking systems typically make corrections on demand (without regard to ongoing image exposure or transfer operations) and such corrections are detrimental to image quality.

Multicolor reproduction apparatus useable for high volume reproduction work therefore present strict registration requirements. The production of a misregistered separation set is costly in that the subsequent production of a degraded composite image forces the printing process to be forestalled or halted while a new set of separations are made. In the color reproduction industry, any waste or increment or process time is significant and is to be avoided.

It is an object therefore of the invention to provide a method an apparatus for web tracking which overcomes the above referenced limitations of the prior art.

SUMMARY OF THE INVENTION

In accordance with the invention, method and apparatus are provided for controlling operations upon a web moving along a path, the web being subject to lateral movement in a direction transverse to the direction of movement of said web along said path, the lateral position of the web is monitored and signals generated in response thereto, in response to said signals, a determination is made if an operation can be performed upon said web without imposing a correction to lateral web movement, and correction is imposed in response to a determination that the operation cannot be performed.

In another embodiment of the invention, the method and apparatus are provided for controlling operations upon a web, the web is moved along a path, the web being subject to lateral movement in a direction transverse to the direction of movement of said web along said path, the lateral position of the web is monitored and signals are generated in response thereto, in response to said signals, a determination is made if an operation can be performed upon said web without imposing a correction to lateral web movement, and correction is imposed in response to said determination that the operation cannot be performed, and means for inhibiting the operation until a determination is made that the operation can be performed.

BRIEF DESCRIPTION OF THE DRAWINGS

In the detailed description of the preferred embodiment of the invention, reference is made to the accompanying drawings, in which:

FIG. 1 is a elevational view in schematic form, of an electrostatographic reproduction apparatus having a photoconductive web moving along a path and including web tracking apparatus according to the invention;

Figure 2A:
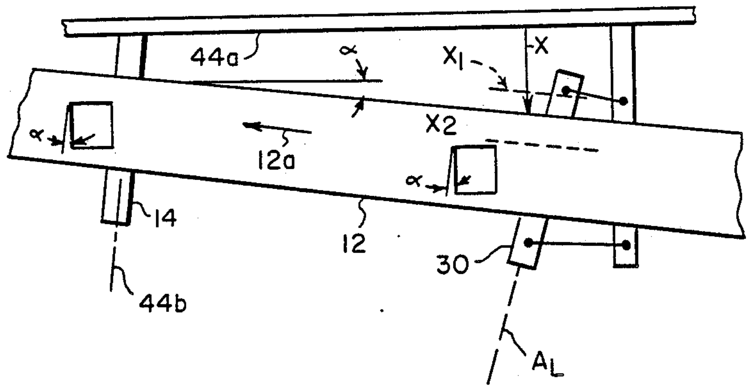
FIGS. 2A and 2B are diagrammatic illustrations representing the movement of the web of FIG. 1, layed out in planar form, as it travels about a portion of its path.

In the drawings and specification to follow it is to be understood that like numeric designations refer to components of like nomenclature.

DESCRIPTION OF THE PREFERRED EMBODIMENT

The apparatus of the preferred embodiment will be described in accordance with an electrostatographic recording medium. The invention, however, is not limited to methods and apparatus for creating images on such a medium, as other media such as photographic film, etc. may also be used to advantage within the spirit of the invention.

Because electrostatographic reproduction apparatus are well known, the present description will be directed in particular to elements forming part of or cooperating more directly with the present invention. Apparatus not specfically shown or described herein are selectable from those known in the prior art.

Referring now to the accompanying drawings, an electrostatographic reproduction apparatus 10 of the electrophotographic type is shown, employing a dielectric photoconductive web 12 adapted to carry transferable images, and including a web tracking apparatus according to this invention, as is schematically illustrated in FIG. 1. The web 12 is, for example, of the type described in U.S. Pat. No. 3,615,414 and includes a photoconductive layer. The web 12, shown as being an endless belt, is supported by transfer backup roller 14, idler roller 16, drive roller 18, tension roller 22, guide rollers 24, 25, 26, 27, and 28, and steering roller 30 for movement along a closed loop path in the direction of arrow 12*a*. The path is associated with typical electrophotographic process stations such as primary and auxiliary charging stations 23*a* and 32*b*, an exposure station such as a polygon laser scanner 34, development stations 36*a*, 36*b*, 36*c*, and 36*d*, a transfer roller or transfer station 38, cleaning station 39, edge pattern sense means 40, an erase lamp 41, and a low surface adhesion applicator (LSA) 42. The LSA 42 applies a compound such as zinc stearate to the web 12 surface to promote the transfer of images to a receiver member 43. Of course, the web tracking apparatus and methods of this invention are suitable for use in reproduction apparatus of other types and with other roller-supported web configuration (e.g., one roller between web supply and take-up spools) where precise lateral web-position control is needed.

In the operation of apparatus 10 according to a typical multicolor electrophotographic process, the web 12 (which is electrically grounded) is moved in the direction of arrow 12*a* about its closed loop path, and a uniform electrostatic charge is placed on the web as it passes the primary charging station 32*a*. Image frames of the charged web are then exposed at exposure station 34 to light from a laser source 34*a* that is directed to the web 12 by a polygonal scanner 34*b*. The laser source 34*a* is modulated by the image information to be reproduced. The image information is furnished to the laser source 34*a* by a suitable data source 35, such as a computer, optical scanner or other appropriate source of image data or signal. It should be understood that the various exposure frames are separated either spatially, i.e., apart from each other by a distance on the length of the web; or temporally, whereby the same image frame is used to form different color separation images in succeeding time periods. The exposure alters the uniform charge and forms a charge pattern corresponding to such image information.

In making multicolor reproductions by, for example, the subtraction color process, the data used to modulate the light from the laser 34*a* is divided into primary color separation images each of which modulate an exposure of a succesive image frame of the web 12. Thus on each image frame there is formed a corresponding modulated electrostatic charge pattern representing respective color separation image of the multicolor reproduction. The pattern is formed by the exposure station 34 by modulating the primary charge on an image frame of the web surface with selective energization of the scanner radiation source in accordance with image data signals. In the case of the illustrated laser 34*a*, this is done by scanning a light beam in the laser scanner's main scanning direction and modulating this light beam with the image information on a dot by dot basis for each line as the web 12 is continuously advanced in the web path direction 12*a*. Alternative light sources, such as a LED printhead or other point-like radiation sources, may be used in place of the exposure station 34. Still other exposure sources, such as imaging sources which include direct optical recording from originals, may also be used.

The modulated electrostatic charge patterns thereby formed are developed with pigmented marking particles by developing station 36*a* to form transferable images. The development station 36*a* includes a developer which may consist of iron carrier particles and pigmented electroscopic toner particles with an electrostatic charge opposite to that of the latent electrostatic image. The developer is brushed over the photoconductive surface of the web 12 and the toner particles adhere to the latent electrostatic image to form a visible, transferable image. The development station may be of the magnetic brush type with one or two rollers. Alternatively, the toner particles may have a charge of the same polarity as that of the latent electrostatic image and develop the image in accordance with known reversal development techniques.

The image or images are then transferred seriatim from the image frames of the web 12 to a corresponding number of receiver members 43 advanced in timed relationship into engagement with the web 12 at the transfer station 38. After the transfer of an unfixed toner image to the receiver, the receiver 43 is removed from the transfer roller and transported to a fuser (not shown) where the image is fixed to the receiver 43. Any residual marking particles remaining on the image frame of the web are cleaned in cleaning station 39 prior to the reuse of that image frame.

The generation of individual color separation images on separate receivers 43 may be accomplished, as described hereinabove, with a single development station 36*a* using a toner of, for example, black pigment. The fixed receivers 43 are thereupon characterized as color separations, or masters, and as such may be removed from the apparatus 10 and utilized in a high-speed xeroprinting, lithographic, or other printing system. However, it is to be understood that the web tracking apparatus according to the present invention is directed to any reproduction apparatus in which the surface of a moving web includes a plurality of image frames for the formation of transferable images. Such apparatus would include, for example, an electrostatic apparatus equipped with a plurality of development stations 36*a*, 36*b*, 36*c*, and 36*d* so as to generate a four-color reproduction of the original image on a single receiver sheet. Each modulated electrostatic charge pattern as described hereinabove is thereby developed with respective pigmented toner particles at a respective development station to form a transferable image. The several images are then transferred seriatim from their respective image frames of the web 12 to a single receiver member 43 at the transfer roller 38. The receiver member 43 is recirculated on or about the transfer roller 38 in synchronization with the approach of each image frame of the web 12 such that the set of four transferred images form an accurately superimposed, multicolor composite image on the receiver 43.

Receiver member 43 can be of a variety of compositions, including but not limited to paper, aluminum plate, transparent film stock, treated film stock such as nickelized ester, photoconductor film, and the like. The receiver 43 is advanced into engagement with the web 12 by a receiver feeder 45*a* and a receiver registration unit 45*b*. Each receiver 43 is fed from the receiver feeder 45*a* to the registration apparatus 45*b*, and then to the transfer roller 38, in a synchronized fashion whereby the receiver is urged onto the web 12 in alignment with a toned image at the transfer roller 38.

To coordinate operation of the various work stations 32*a*, 32*b*, 36*a*, 36*b*, 36*c*, 36*d*, 38, 39, 41, 42, 45*a*, and 45*b*, with movement of the image frames on the web 12 past these stations, the web 12 has a plurality of indicia such as perforations along one of its edges. These perforations generally are spaced equidistantly along the edge of the web 12. Sensing means 40 is fixed at a location along the path of web movement for sensing web perforations. The sensing means 40 supplies signals to a logic and control unit (LCU) 47 which contains a digital computer. The LCU 47 has a stored program responsive to the input signals for sequentially actuating and de-actuating the work stations, as well as for controlling the operation of many other machine functions. Additional or other encoding means may be provided as known in the art for providing the precise timing signals for control of the various functions of the apparatus 10. Programming of a number of commercially available digital computers is a conventional skill well understood in the art. This disclosure is written to enable a programmer having ordinary skill in the art to produce an appropriate control program for the requisite apparatus. The particular details of any such program would, of course, depend on the architecture of the designated digital computer.

To obtain a faithful multicolor reproduction, the transferable images must be transferred to the receiver 12 in accurate register. Accordingly, the angular and the lateral (cross-track) movements of the web 12 as it travels about the closed loop path between the exposure 34 and transfer stations 38 must be controlled to minimize angular and lateral deviation between successive images transferred from the image frames of the web 12. Such control is accomplished by a computer-controlled web tracking system according to the present invention, described hereinbelow.

Figure 2B:
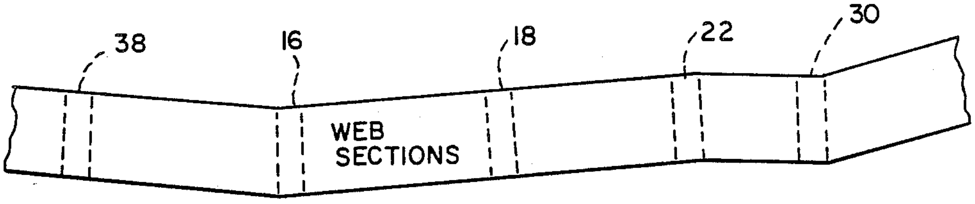

In such web tracking apparatus, the roller 14, about which the web travels in relation to transfer roller 38, has an axis of rotation which is spatially fixed relative to the machine frame of the reproduction apparatus 10. As seen in FIGS. 2A and 2B, the diagrammatically-represented machine frame is designated by numeral 44*a* and the rotational axis of roller 14 is designated by numeral 44*b*. The web 12, travelling in direction of arrow 12*a*, approaches and leaves the roller 14 perpendicular to the axis 44*a* in the absence of external forces. The web path 12*a* is subject to angular and lateral constraints depending upon the degrees of freedom associated with the various rollers 14, 16, 18, 22, 24, 26, 28, and 38. The web 12 is subject to an angular constraint as it passes over the back-up roller 14 and drive roller 18. Idler roller 16 and tensioning roller 22 are gimballed by suitable known means not shown and thus allow the web to change its lateral direction as it passes thereon.

Figure 3:
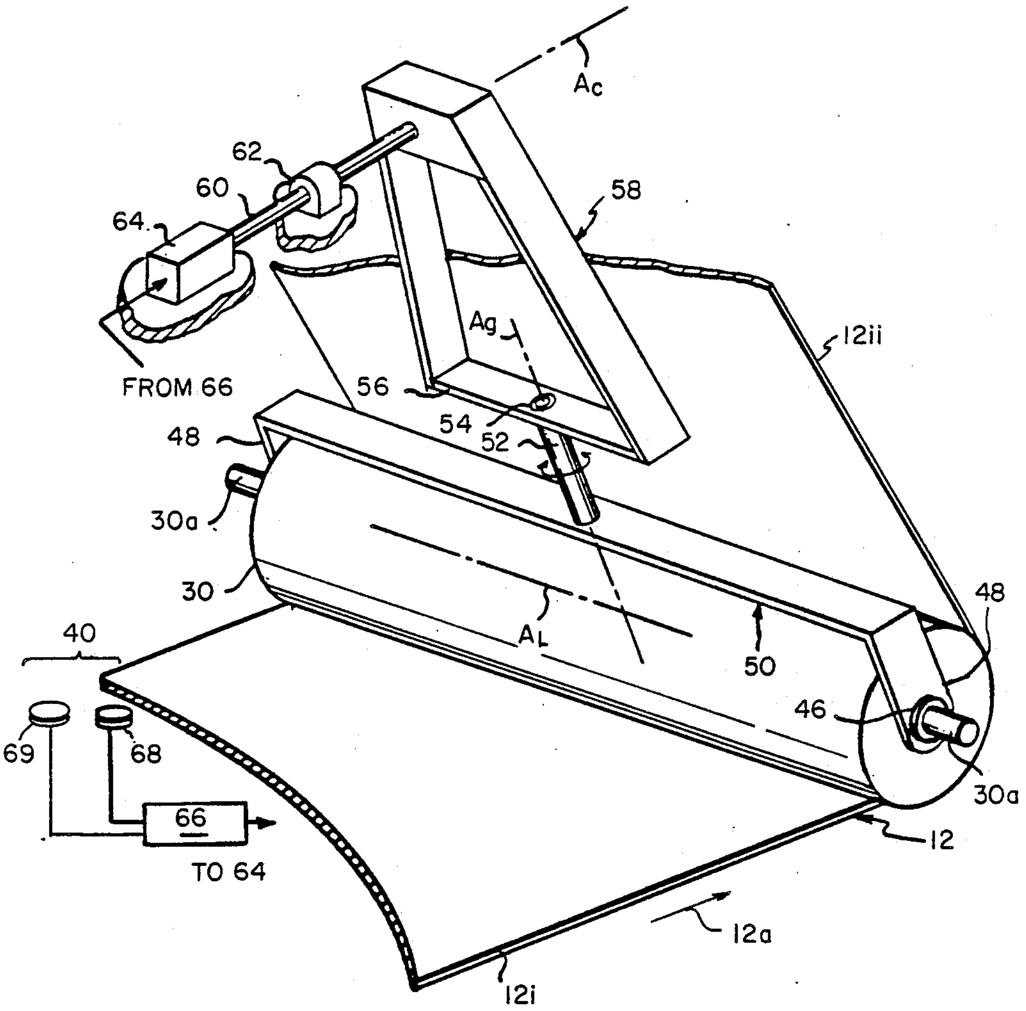
FIG. 3 is a view in perspective of a portion of the web tracking apparatus of FIG. 1 particularly showing a steering roller, its support, and the servo motor associated therewith, with portions removed or broken away to facilitate viewing.

As shown in FIG. 3, in the web path upstream of the roller 14, the web 12 is supported by the steering roller 30 and is wrapped around a portion of the circumference of the steering roller 30 to define a span 12*i* approaching the steering roller and a span 12*ii* leaving the steering roller. The wrap angle (i.e., the included angle between the plane of span 12*i* and the plane of span 12*ii*) need only be of a magnitude sufficient to provide frictional drive of the roller 30 by the web 12. The lateral position of the web 12 approaching the roller 14 is controlled by the steering roller 30. Such lateral position is defined in terms of the distance (designated by letter X in FIG. 2*a*), taken at a preselected location between rolles 14 and 30, of a marginal edge of the web in span 12*ii* from the plane of the machine frame 44*a*.

The steering roller 30 is also gimballed and includes stub shafts 30*a* extending from the roller coincident with the longitudinal axis $A_L$ of such roller. The stub shafts 30*a* are rotatably supported in bearing 46 mounted in the arms 48 of a generally U-shaped roller carriage 50 so that roller 30 freely rotates about its axis $A_L$. A shaft 52 is fixed to and extends from the carriage 50. The longitudinal axis $A_g$ of the shaft 52 is perpendicular to the axis $A_L$ and intercepts such axis at its midpoint, between the ends of roller 30. Further, axis $A_g$ is parallel to the plane of the span 12*i* of the web 12 approaching the steering roller 30 to define a gimbal axis for the steering roller.

Figure 4:
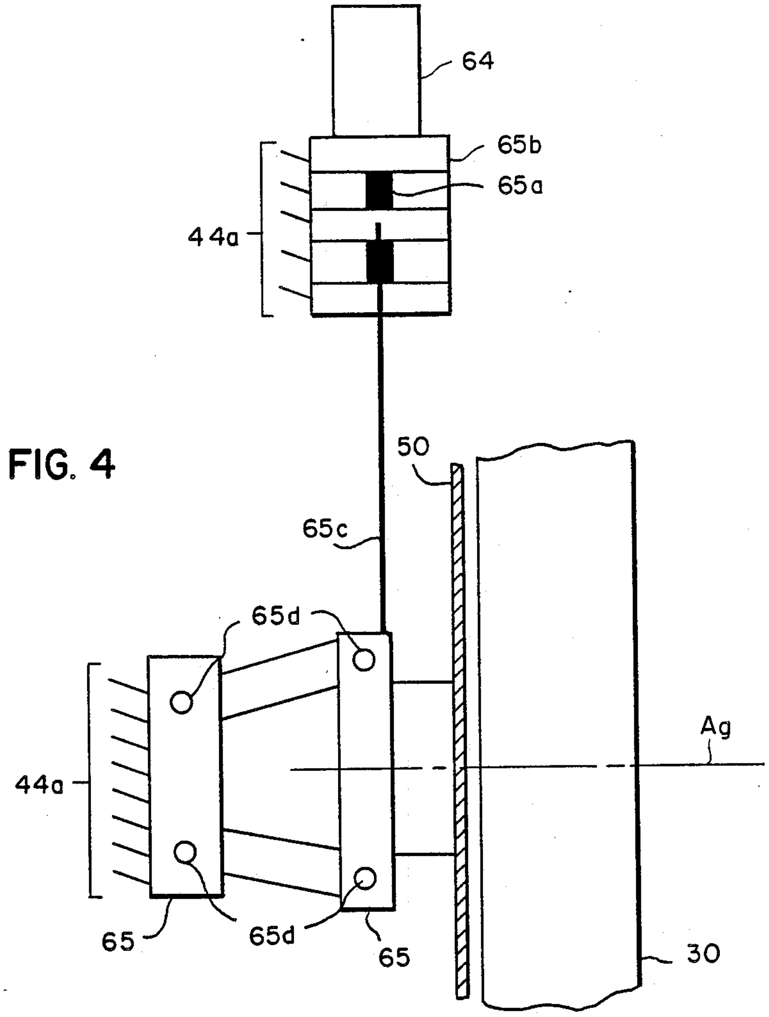
FIG. 4 is a top view in schematic form of an alternative embodiment of the steering roller, support, and servo system of FIG. 3 with portions removed or broken away to facilitate viewing.

The shaft 52 is rotatably supported in bearing 54 mounted in a caster subframe 56. The caster subframe 56 is supported, in turn, by a yoke 58 mounted on a shaft 60 for rotation therewith. The shaft 60 is rotatably supported in a bearing block 62 fixed to a portion of the frame of apparatus 10. A typical D.C. servo motor 64 (i.e., a motor in which the angular velocity of the motor output shaft is directly proportional to the electrical potential applied to the motor) is coupled to the shaft 60. The output shaft of the servo motor 64 selectively rotates the shaft 60 in either direction about its longitudinal axis $A_c$. The longitudinal axis $A_c$ of the shaft 60 defines a caster axis about which the steering roller 30 is rotatable, such caster axis $A_c$ being perpendicular to the plane of the span 12*i* of web 12. Thus, the steering roller 30 of this illustrative embodiment is both gimballed and castered. Another preferred arrangement for castering the steering roller 30 suitable for use with this invention is illustrated in FIG. 4, wherein the steering roller 30 is mounted on a castering device 65 attached to the frame 44*a*. Actuation of the servo motor 64 rotates a lead screw 65*a* in a linear slide mechanism 65*b* so as to extend or retract a servo system connecting rod 65*c*, which causes the joints in the castering device 65 to pivot and the steering roller 30 to swing about the castering device joints 65*d*. Of course, other arrangements for gimballing or castering the steering roller 30 are suitable for use with this invention. Moreover, in accordance with this invention, in certain other roller supported web configurations where precise lateral web position control is needed, the steering roller may be mounted for castered movement only.

The steering roller 30, in controlling the lateral position of the web 12 as will be described, corrects for long term lateral movements of a marginal edge of the web in span 12*ii* relative to the machine frame 44*a* without attempting to follow short term lateral movements. That is, the roller 30 steers the web 12 so that it progresses laterally back-and-forth between predetermined allowable marginal edge position limits $X_1$ and $X_2$ (see FIG. 2A). While the web edge remains within limits $X_1$ and $X_2$, transferable images are formable on successive image frames of the web 12 in a range acceptable for accurate superimposed transfer of such images to a receiver 43 to form a faithful multicolor reproduction.

Figure 5:
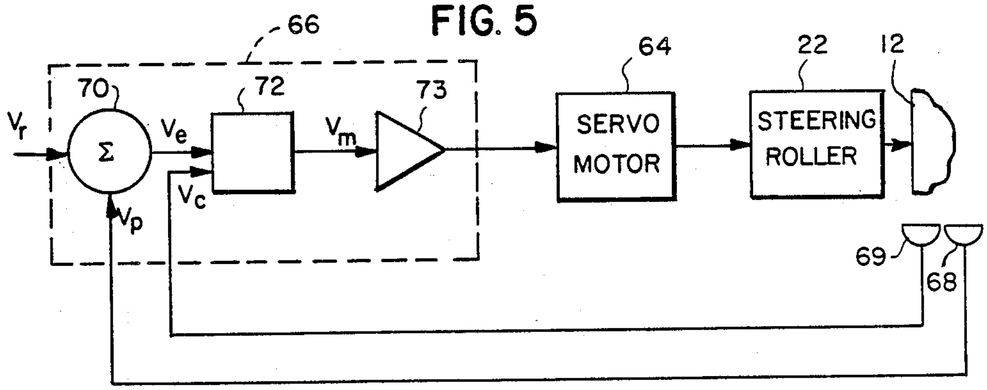
FIG. 5 is a block diagram of a servo motor control circuit for the steering roller of FIG. 3.

Correction of the long term lateral web movement is controlled by the LCU 47 which includes a control circuit 66 as shown in FIG. 5. The circuit 66 is operatively coupled to sense means 40 which preferably incorporates sensors 68 and 69 located adjacent to a marginal edge of the web 12 anywhere along the web path (see FIG. 3). The sensor 68 may be any of a variety of known types of photoemitter/photodetector pairs which may detect the lateral position X of the marginal edge of web 12 and generates a signal $V_P$ indicative of the lateral edge motion. For example, sensor 68 may be a photoemitter/photodetector pair having a signal value (electrical voltage potential) proportional to the area of the sensor covered by the web. Alternatively, the sensor may be a potentiometer which is in contact with the web edge whereby the changing resistance corresponds to lateral movement of the edge. Rotational position data (indicating the exact point of the web for in-track registration) is taken from signal $V_c$ which may be provided by photoemitter/photodetector pair 69 or other sensor for determining the web rotational position. In the preferred embodiment, sensor 69 optically reads registration perforations (or other indicia of web rotation) on the web 12 so as to provide a pulse train corresponding to discrete increments of web rotation. Sensor 69 thereby detects the rotational position of the web 12 such that $V_c$ is output therefrom as a second photoemitter/photodetector signal having a signal characteristic that is proportional to the sensed passage of perforations, bar code, or other indicia on the web margin.

The sensor signal $V_p$ is applied to a summing device 70 where it is compared to a reference signal $V_r$ to produce a signal $V_e$ of a value which is proportional to the lateral position of the edge of the web 12 in span 12*ii* relative to the plane of the machine frame 43. The reference signal $V_r$ is a preselected input electrical potential level. The value of signal $V_r$ may be preselected as zero in which case the value of signal $V_e$ is directly proportional to the web edge position relative to the machine frame; or, $V_r$ may be of any other desired value such that the value of the signal $V_e$ is biased to be directly proportional to the web edge position relative to some other reference plane spaced from the machine frame (e.g. ideal location of edge of web from the machine frame). Signals $V_e$ and $V_c$ are then applied to a computer-controlled web tracking system 72 where a servo motor control signal $V_m$ may be produced.

Upon a determination by the tracking system 72 that one of the two lateral limits $X_1$ or $X_2$ is predicted to be reached within a predetermined amount of web rotation, that is, during a time period or web length required for imaging or transfer of the image frames, an appropriate control signal $V_m$ is produced to which the servo motor is responsive. Such signal is amplified by amplifier 73 and transmitted to the servo motor 64 to actuate the motor and proportionally rotate the shaft 60 in the appropriate direction to rotate the steering roller 22 significantly about its caster axis $A_c$. The steering roller then remains in the adjusted position to steer the web 12 so that the edge of the web reverses its aforementioned progression (drift) to one of the lateral limits, for example $X_1$. That is, the web will thereupon drift away from the first lateral limit position, $X_1$, to the opposite lateral limit position, $X_2$. Thereafter, upon a determination by the tracking system 72 that the web drift has progressed to the opposite (second) limit lateral position, $X_2$, a control signal $V_m$ (of opposite direction) is produced to which the tracking system 72 is responsive to rotate the steering roller in the opposite direction about the caster axis causing the web to move laterally back toward the first limit position $X_1$. It is to be understood that the foregoing sequence should be taken to describe the alternative tracking correction, that is from $X_2$ to $X_1$ and to $X_2$ again, merely by exchanging the lateral limit terms $X_1$ and $X_2$.

The steering roller 30 is thus adjustably positioned to cause the web edge to move laterally from one limit position toward the opposite limit position. As with the instance described above, the steering roller 30 remains in its adjusted position until it is rotated to cause the web 12 to laterally move back toward the opposite limit position. In this manner normal tracking is quickly achieved.

The maximum allowable lateral movement of the edge of web 12 for the reproduction apparatus 10 is for example a predetermined value from a preselected reference location (or neutral position). With reference to FIG. 2A, the value would preferably equal one-half of the distance between $X_1$ and $X_2$. The signal $V_m$ is produced by the tracking system 72 in the aforementioned manner to actuate the servo motor 64 to reposition the steering roller and to cause the overall direction of the lateral movement of the edge of the web to progress away from such maximum limit position toward the opposite maximum limit position. As a result, the web alternately and slowly progresses laterally between the maximum lateral limit positions $X_1$ and $X_2$. The digital value of for producing the signal $V_m$ is retained in the memory portion of the tracking system 72.

With the lateral position of the edge of the web 12 controlled by the steering roller 30, the span 12*ii* of the web between the steering roller and the transfer backup roller 14 is precisely located; i.e. its angular ($\alpha$) and lateral (X) positions are known. The guide rollers 24, 26, and 28 are castered and have only a small wrap angle respectively with the web. Each roller is formed with a substantially frictionless surface, such as TEFLON® for example, and has only a small wrap angle with the web so as to minimize any lateral disturbance or constraint on the web. Therefore, they apply no lateral disturbance or constraint to the web. The idler roller 16 is castered and gimballed, and tensioning roller 20 is also gimballed, so that the web 12 is constrained (according to the principles discussed in U.S. Pat. No. 3,913,813) to approach roller 18, as shown in FIG. 2B. The roller 14, assisting the action of the transfer roller 38, is fixed for rotation about its longitudinal axis. Thus, adjacent image frames of the web 12 will have a minimum of lateral movement on travel of the web between roller 14 and roller 22.

Figure 6:
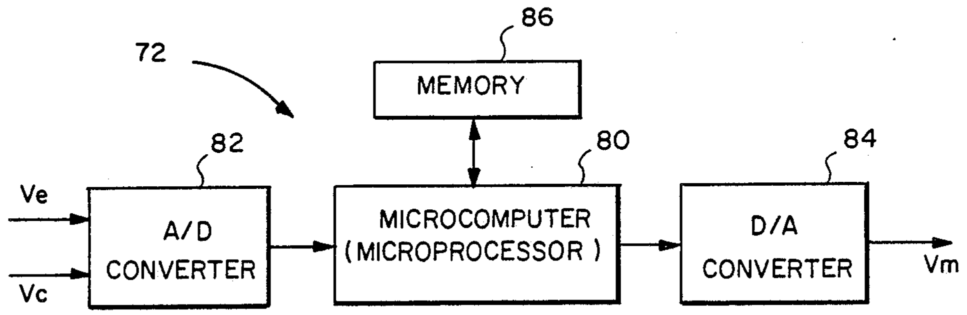
FIG. 6 is a schematic diagram of a computer-controlled web tracking system which provides tracking control in the servo motor control circuit of FIG 5.

As illustrated in FIG. 6, the computer-controlled tracking system 72 includes a digital computer 80 which is preferably a microprocessor, an analog-to-digital (A/D) converter circuit 82, a digital-to-analog converter (D/A) circuit 84, and a memory 86. The selection of the specific components and values for the tracking system circuitry and the amplifier 73 to produce the appropriate value of signal $V_m$ is dependent upon the particular servo motor, web, and web tracking apparatus geometry. This disclosure is written so that one of ordinary skill in control system design will select such devices and values using conventional web transport stability analysis techniques and conventional control system theory.

The web tracking system 72 adaptively calculates the minimal steering correction control signal $V_m$ necessary to maintain the web within the cross-track limits, and predicts the need for a correction so that the correction may be implemented in a timely fashion without degrading the registration of images produced by the apparatus 10. The correction is refined by an iterative process; adaptive software routines which reside in the microprocessor 80 are utilized to optimize the amount of correction. The direction and rate of web drift is a function of the angular position of the steering roller 30. The adaptive routines therefore optimize the control signal $V_m$ to minimize the frequency of steering corrections and thus maximize the duration of web travel before corrections. The control signal is further optimized to provide steering corrections which produce a constant rate of web drift. The adaptive calculation schemes, or algorithms, used by the web tracking system are discussed hereinbelow with reference to FIGS. 7–9.

Figure 7:
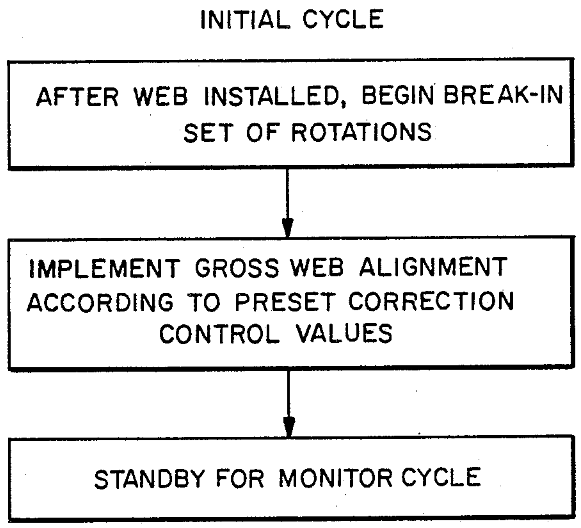
FIGS. 7 and 8 are flow charts of the initial and monitor cycles, respectively, of the web tracking scheme or algorithm for the computer-controlled web tracking system of FIG. 6.

Turning now to the adaptive correction algorithm of the computer-controlled tracking system 72, the first part of the algorithm is exemplified in the flow chart labeled "Initial Cycle" and illustrated in FIG. 7. During the initial cycle, the electrostatographic process is not used or is inhibited, as the initial cycle is intended as a period for breaking in the web 12. However, the initial cycle need not be repeated until the web has been replaced. The initial cycle may be implemented by commands supplied by the LCU 47 to operate the drive roller in a sequence known in the art. For these reasons, the initial cycle typically is implemented after the installation of a web and may be included in the web installation procedure, or it may be implemented later as a maintenance procedure. Alternatively, because the initial cycle precedes the onset of the first monitor or print cycle, the microprocessor 80 may be programmed to perform the initial cycle as a first task in the first print job to follow web installation, and thus the initial cycle may be contiguous with the first electrostatographic operation of a new web 12.

Upon the installation of a web 12 in the apparatus 10, a "break-in" set of web revolutions is performed wherein commands supplied by the LCU 47 to operate the drive roller in a sequence known in the art cause the web 12 to be rotated. Such a set includes a sufficient number of revolutions, typically eight to ten revolutions, to accommodate gross changes in the web configuration as the web 12 stretches and conforms to its path of rotation and the various rollers 14, 16, 22, 24–30, etc. The break-in set need not be repeated until the web has been replaced.

During the rotation of the web 12 through the break-in set, the alignment of the web 12 is accomplished in a gross manner. Such control is accomplished so as to bring the operation of the apparatus 12 up to speed preparatory to the operation of an adaptive web tracking control, after the break-in set, as will be discussed hereinbelow. Preferably, as has been described, signals $V_e$ and $V_c$ are received by the web tracking system 72 where a servo motor control signal $V_m$ may be produced to actuate the servo motor 64. In the break-in set of web rotation, as the web lateral position reaches a maximum limit $X_1$ or $X_2$, a servo motor control signal is produced to reposition the steering roller so as to cause the overall direction of the lateral movement of the web edge to alternately progress between the maximum lateral limit positions $X_1$ and $X_2$. The digital value for producing the signal $V_m$ during the break-in set is a fixed, preset value that is selected by the microprocessor 80 from the memory 86. The preset value may be programmed into memory 86 either during the manufacturing of the apparatus 10, or during the installation of the web 12. In gross steering correction, therefore, the steering roller 30 remains in its adjusted position until it is rotated by a fixed amount (the preset steering correction value) to cause the web 12 to laterally move back toward the opposite limit position. In this manner a gross control of tracking is achieved within the break-in set of web rotations. Thus, any lateral position drift of the web 12 during the first several web revolutions in the monitor cycle (described hereinbelow) is much less than the web edge irregularity, due to the establishment of gross web lateral alignment.

Figure 8:
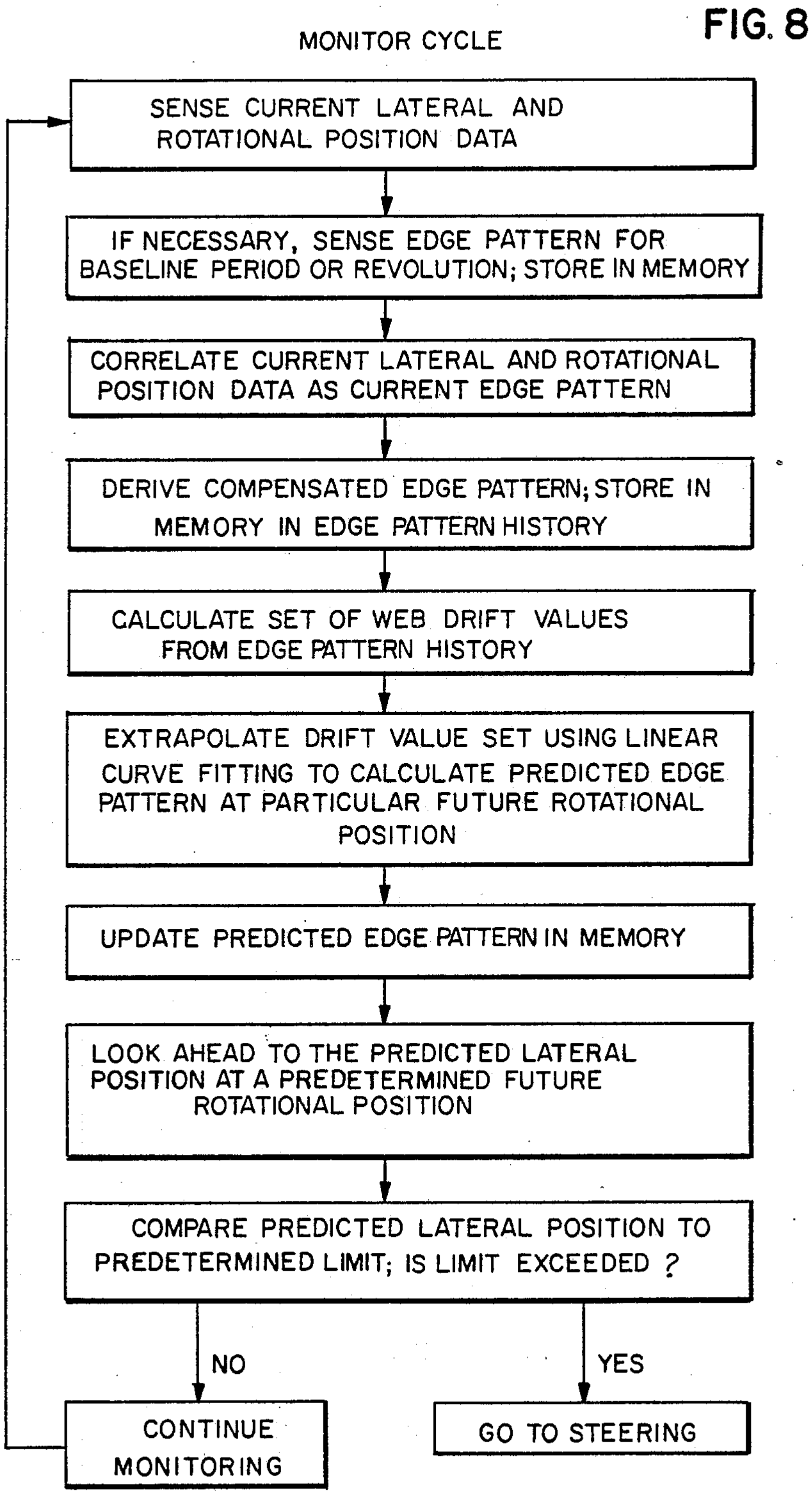
Figure 9:
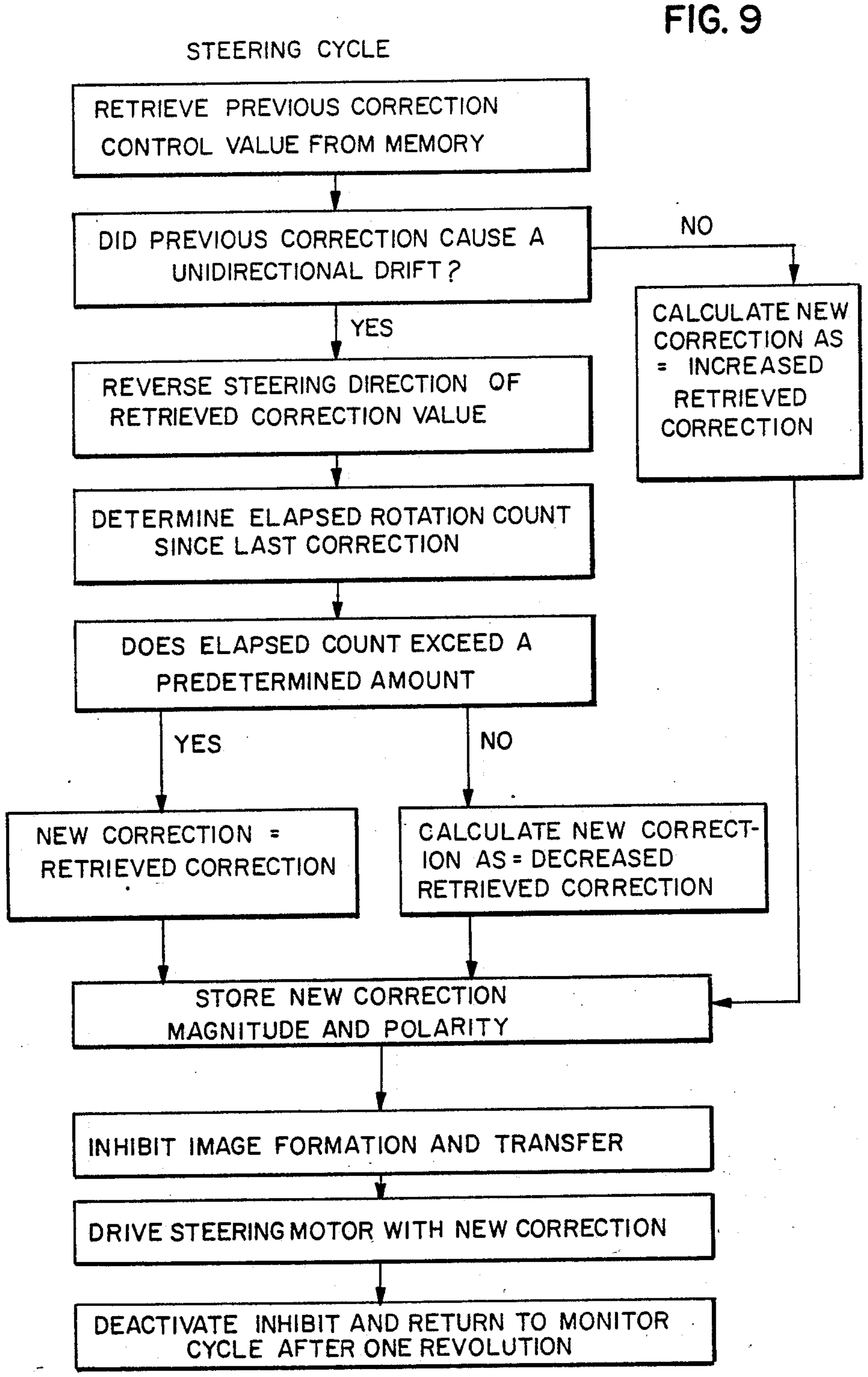
FIG. 9 is a flow chart of the steering correction cycle of the web tracking scheme or algorithm for the computer-controlled web tracking system of FIG. 6.

As further illustrated in FIG. 8, the web tracking system 72 monitors web lateral or cross-track movement for the remainder of machine operation until another initial cycle is necessitated. While tracking the web cross-track movement, the web tracking system 72 performs a sequence of steps which, for illustrative purposes, is considered in first part as the monitor cycle and in second part as the steering correction cycle. The web tracking system repeats the monitor cycle again and again, continuously, until a determination is made to initiate a steering correction cycle. After a steering cycle is complete, the tracking system 72 resumes its repetition of the monitor cycle. However, during the operation of the apparatus 10, regardless of which cycle is in effect, the tracking system continuously receives and stores the rotational and lateral position data, $V_c$ and $V_e$.

A preliminary task performed in at least the first monitor cycle to follow an initial cycle is the sensing of a baseline edge pattern for the web edge. The edge pattern is generally meant herein to include both the cross-track, or lateral edge position of the web, and the in-track, or rotational, position of the web. The edge pattern is sensed by sensors 68, 69 for a short amount of travel of the web, typically one revolution. Additionally, the individual lateral and rotational position data points are stored in memory 86. In the preferred embodiment, at least 342 data points are sensed and stored; however, the number of data points are selectable according to considerations known generally in the digital control system art. Signals $V_c$ and $V_e$ are correlated by the microprocessor 80; that is, the microprocessor 80 associates the lateral position data Ve with a corresponding rotational position data Vc and stores the correlated data as edge pattern data in the memory 86. The baseline edge pattern thereby provides a reference of web edge deviation, i.e., web edge irregularity, that is particular to the installed web. During following web revolutions, the tracking system compares the current edge pattern with the baseline edge pattern to discern a variation in lateral position other than normal deviations or irregularities in the web edge. Hence, the stored baseline of web irregularity is an accurate record which allows the tracking system 72 to distinguish, as will be described below, between a normal lateral variation of the web edge, i.e., edge run out, and a variation of the web lateral position, i.e., lateral position drift.

The present invention contemplates two alternative methods for the accumulation of a baseline edge pattern. One method is to perform the baseline sensing for a first web revolution following the initial cycle and reserve the data in memory for the subsequent monitor cycles until another initial cycle is performed. The second method is to perform the baseline sensing for a first web revolution following the initial cycle and reserve the data in memory only until the next web revolution, whereupon the stored data is used for determining the true web lateral position, then updated with the lateral position data of that next (second) web revolution. The data is refreshed again at each subsequent revolution, and so on, throughout the remainder of machine operation until another initial cycle is implemented. Thus, in the second method, the recorded edge pattern from the web revolution which immediately precedes the current web revolution is the reference or baseline record for the current web revolution. In either method, a baseline edge pattern is sensed and retained in memory for use in calculating the true web lateral position in the current web revolution. The second method offers an advantage in that it further discerns any web edge irregularity due to any deterioration in the web edge that occurs over the life of the web.

After the tracking system compares the current edge pattern with the corresponding point in the baseline edge pattern to calculate the true web lateral postion, the compensated current edge pattern is then stored in memory. Thus, the compensated current edge pattern becomes the latest entry in what may be termed the stored edge pattern history. However, data which precedes the compensated edge pattern data into memory 86 is retained as past compensated edge patterns. The compensated current edge pattern and the past compensated edge patterns are thus considered collectively as the edge pattern history. Next, the microprocessor 80 calculates a set of web lateral drift values, each value being the difference between successive compensated lateral position values of the edge pattern history.

Using a known linear extrapolation algorithm, which resides in the microprocessor 80, the tracking system 72 extrapolates the set of calculated drift values to generate a predicted edge pattern, i.e., the web lateral position at a predetermined future web rotational position. The microprocessor 80 continously updates and retains in memory the predicted edge pattern as each new drift value is calculated. In the preferred embodiment, the microprocessor 80 calculates a predicted lateral position expected at a selected future rotational position. The future rotational position is selected according to the number of exposures and transfers expected in the production of the requisite set of separation images. As described hereinabove, the task of the web tracking system is to predict the web lateral position throughout the period for production of an image set, so as to avoid making corrections during that period. In some applications, all frames in a set may be imaged and transferred within one rotation of the web 12. The future rotational position is thereby selected as at least one revolution from the current web position. In other instances, the job may require several revolutions of the web, whereupon the future rotational position is selected as at least a corresponding number of revolutions from the current position.

The extrapolation is performed according to a known linear curve fitting method wherein a linear function $$f(x)=a+bx+cx^2+dx^3+\ldots$$

is fitted to a set of available data points $$f(x_o)=A,\ f(x_1)=B,\ f(x_2)=C,\ldots$$

once the coefficients a, b, c, d, . . . etc., are defined. Thus, where f(x) is defined as the predicted web lateral position at a x future rotation, by entering a chosen value for x, the predicted lateral position of the web can be calculated. For example, when the web lateral positions are known (according to the stored edge pattern history) as being at point $P_1$ at a first revolution and at point $P_2$ at a second revolution, one may solve $$P_1a=a+b \text{ and } P_2=a+2b$$

for a and b in a first-order fit. Then, by utilizing $x=3$, the predicted web lateral position at one revolution ahead in time, i.e., at the third revolution ($P_3$), may be calculated. Other future web lateral positions may be similarly calculated so as to create a predicted edge pattern. It will be appreciated that the particular future rotational position of concern is selectable as any web rotational position, such as at a non-integral number of revolutions from the current rotational position. Importantly, the particular future rotational position is selectable according to the aforementioned requirements for avoiding the implementation of a correction during an image write or transfer phase of the monitor cycle. Further, it is to be understood that other methods of extrapolation or predictive modeling may be utilized. The predictive algorithm is not limited to linear interpolation and, for example, a least-squares fitting of a non-linear function to the set of sensed information may be provided in lieu of the above by those skilled in the art.

The microprocessor 80 thus continously determines the extent of the future web lateral position drift. Using the predicted edge pattern, the microprocessor 80 may look ahead to determine if the predicted lateral edge position is expected to exceed the aforementioned maximum allowable lateral movement limit. In the event the web lateral position at the particular future rotational position exceeds the allowable limit, the microprocessor 80 initiates the steering correction cycle of FIG. 9. However, if the calculated lateral position is within the predetermined limit, no steering correction is initiated, and the monitor cycle sequence is repeated, i.e., the web tracking system 72 remains in the monitor cycle mode.

Alternatively, the predicted edge pattern may be examined by the microprocessor 80 to determine the rotational position at which the web can be expected to drift beyond the predetermined limit. For the purposes of this description, such a position will be termed the lateral limit transition. Having determined such a rotational position, the microprocessor 80 may then calculate an appropriate rotational position for initiating the steering action indicated in FIG. 9. The appropriate rotational position for steering correction would be a point which precedes the lateral limit transition. The web rotation would continue and the monitor cycle would be repeated until the calculated rotational position appropriate to the initiation of a steering correction is reached, whereupon the steering correction would be initiated.

When a determination has been made to initiate a steering correction, the steering correction cycle is begun. As previously described with respect to FIG. 3, the servo motor 64 is capable of selectively rotating the shaft 60 in either direction about its longitudinal axis $A_c$. To effect a web tracking correction, or steering event, an inhibit signal is generated by the microprocessor 80 for use by the LCU 47 to reserve (inhibit) the flow of image data from the data source 35 which would otherwise be directed to the laser **34*a* during a steering correction cycle. An actuation of the servo motor 64 causes a rotation of the steering roller 30 such that precise lateral web position control is effected according to the value of the control signal outputted by the microprocessor 80 to the D/A converter 84. After the correction has propagated through the web 12, which typically takes one web revolution, the inhibit mode is deactivated. The steering roller 30 thereby changes the lateral position of the web 12 according to determinations of the web cross-track registration by the microprocessor 80**, as will now be described.

The microprocessor 80 retrieves from memory 86 the digital value of the control signal $V_m$ that was used in the most recent web steering event, or correction. (The retrieved control value is hereinafter termed the retrieved correction.) The microprocessor 80 then reviews the edge pattern history that has been recorded since the most recent correction event so as to calculate a new steering control value. Should the edge pattern history indicate that the web 12 has drifted unidirectionally, that is, from $X_1$ to $X_2$ or vice versa, a new steering control value is derived having the same amount as the retrieved correction but which indicates a reversed direction of web drift. Further, the microprocessor 80 compares the current web rotational position with the rotational position of the web 12 that received the most recent correction. The differential in elapsed rotations is compared to a predetermined number. In the event the differential is found to equal or exceed the optimized number, the new control value is still unchanged. In the event the differential is less than the predetermined number, the microprocessor 80 decreases the new steering control value so as to lessen the rotation of the steering roller 30. The microprocessor 80 then outputs the new steering control value to the D/A converter 84.

However, the edge pattern history may be found to indicate that the most recent correction was ineffective or incomplete. In such a case the web has drifted not unidirectionally in one constant movement between limits $X_1$ and $X_2$, but randomly within the limits, or perhaps from $X_1$ to a point between $X_1$ and $X_2$ and then returning to $X_1$. The new control value is accordingly derived differently than described above. The incomplete nature of the previous web drift motion is discerned as undesirable, and the microprocessor 80 will calculate a new control value which reflects no reversal in web drift direction but which includes an increase to be applied to the retrieved correction. The microprocessor 80 increases the new steering control value so as to increase the rotation of the steering roller 30. Having adjusted the new steering control value, the microprocessor 80 outputs the (adjusted) new steering control value to the D/A converter 84 for conversion to an analog signal.

The steering control value that is thereby implemented at each correction event is thus optimized in terms of stabilizing the rate of web drift and decreasing the frequency of corrections. The adjustment is selected by the microprocessor 80 to optimize the effect of the correction such that from correction to correction, the extent of the correction is not only minimized but also made more consistent. Hence, by referencing each new correction to the correction used in the most recent correction, the rate of web lateral drift is stabilized. By increasing or decreasing the extent of the servo motor 64 rotation so as to optimize the correction amount, the frequency of corrections is decreased and therefore more reprographic operations are accomplished between corrections. The outputted control value is also stored in memory 86 for use in the calculations necessary in the next correction event.

$V_m$, the analog version of the derived control value produced by the microprocessor, is thereupon amplified and supplied as a motor drive signal to the servo motor 64. The steering roller 30 rotates about the caster axis $A_c$ to cause a drift in the web lateral position. After the correction is applied, the web 12 must rotate through at least one full revolution to be fully corrected. At the end of a full web revolution, the steering cycle is complete and the aforementioned inhibit control of image writing and transfer functions is removed. The reproduction apparatus 10 then returns to the monitor cycle.

A sufficiently large preset control value is stored in memory 86 to be useable as the first retrieved correction when the web is first put on the machine. Each installation of a new web causes a new preset control value to be loaded in the memory 86. As the web tracking system quickly accumulates a stored history of web steering corrections, the servo motor signal $V_m$ is naturally reduced and the elapsed number of rotations between corrections will correspondingly increase. There is a limit to reducing the $V_m$ level whereupon the correction becomes ineffective or inconsistent and the subsequent web drift becomes accordingly non-unidirectional, i.e., random or multidirectional. At such a point, the microprocessor will slightly increase the extent of the steering correction, as was described hereinabove, to return the system to the penultimate steering correction level. The web tracking system 72 therefore adjusts each new control value so as to reach, and then maintain, an effective servo motor signal $V_m$ that corresponds to an optimal (i.e., maximum) number of elapsed rotations between corrections. The consistency, or stability, of web drift rate is correspondingly improved to an optimal point as well. At such a point each newly retrieved correction receives little or no adjustment; a maximum duration of web travel between corrections, and a stability of drift rate, are thereby achieved and may be maintained for substantial periods of web operation. However, as (for example) the web ages and its coefficient of friction changes, or as dust and toner particles accumulate on the tracking subsystems, the tracking system response changes and the web tracking system adjusts each newly-derived correction to compensate.

Significant advantages result from the methods and apparatus of the present invention. In the illustrated apparatus 10, images are formed on adjacent image frames of the web 12 and then transferred to a receiver sheet 43 in the transfer station 38. Such formation and transfer of images with respect to a web 12 operated under the control of the web tracking system 72 occurs in the required accurate register, so as to form a set of color separations on separate reciever sheets 43 for use in a separate process for producing faithful composite multicolor reproductions. Alternatively, as discussed hereinabove, the web tracking system 72 may be operated to ensure the formation of multiple color separation images on a web 12, and the transfer of the images to a single receiver, so as to directly create an accurate multicolor composite reproduction. The present invention may also be incorporated in a method and apparatus wherein images are transferred from the web 12 to an intermediate member which thereupon transfers the toned images to the ultimate receiver. Furthermore, the precise location of the web 12 in the span 12ii between rollers 30 and 14 assures that all related transferable images have substantially the same angular relationship ($\alpha$) to the web and are thus transferred from the web to receiver member with the same angle to prevent any angular misalignment between the images at transfer. Importantly, due to the predictive nature of the calculations made by the web tracking system 72, corrections are not initiated during the formation or transfer of separations, and thus the degradation of separations due to such corrections is prevented. Similarly, due to the adaptive nature of such calculations, the frequency of corrections is minimized and consequently the number of undergraded separation sets that may be produced between web tracking corrections is maximized.

The invention has been described in detail with particular reference to preferred embodiments thereof, but it will be understood that variations and modifications can be effected within the spirit and scope of the invention as claimed hereinbelow.

What is claimed is:

1. A method for controlling operations upon a web moving along a path, the web being subject to lateral movement in a direction transverse to the direction of movement of said web along said path, said method comprising the steps of:

(a) monitoring the lateral position of the web;

(b) generating signals relative to a prediction that the transition of the web's lateral alignment beyond a predetermined allowable limit will occur during a time period or web length required for an operation; and (c) imposing said correction in advance of said transition.

2. The method of claim 1 and wherein said correction is imposed by repositioning a steering member that is directing said web so as to effect a change in the lateral movement of said web.

3. The method of claim 2 wherein said operation comprises the steps of imaging a plurality of image frames upon said web and transferring a corresponding plurality of said image frames to a record member.

4. The method of claim 3 and wherein the plurality of image frames are transferred in register in superposed fashion.

5. The method of claim 4 and wherein said image frames represent color separation images to be formed on the record member.

6. The method of claim 5 and including the step of developing the respective color separation images with toner of respective different colors.

7. The method of claim 2 wherein said operation comprises the steps of imaging a plurality of image frames upon said web and transferring a corresponding plurality of said image frames to a corresponding plurality of members.

8. The method of claim 7 and including the step of inhibiting imaging of said plurality of image frames upon said web until a determination is made that during subsequent imaging a lateral correction will not be made whereby there is reduced the misregistration between corresponding portions of the subsequent image frames.

9. The method of claim 1 wherein said operation comprises the steps of imaging a plurality of image frames upon said web and transferring a corresponding plurality of image frames formed on said web to another member.

10. The method of claim 9 and including the step of inhibiting imaging of said plurality of image frames upon said web until a determination is made that during subsequent imaging a lateral correction will not be made whereby there is reduced the misregistration between corresponding portions of subsequent image frames.

11. The method of claim 10 and wherein the plurality of image frames are transferred in register in superposed fashion upon a record member.

12. The method of claim 11 and wherein the image frames represent color separation images to be formed on the record member.

13. The method of claim 12 and including the step of developing the respective color separation images with toner of respective different colors.

14. The method of claim 1 wherein in step (a) monitoring is done by sensing the position of an edge of the web and wherein said signals represent variations of the edge structure of said web edge being monitored.

15. The method of claim 1 wherein said steps (a) and (b) are performed continuously.

16. A method for controlling operations upon a web moving along a path the web being subject to lateral movement in a direction transverse to the direction of movement of said web along said path, said method comprising the steps of:

sensing the edge pattern of said web, said edge pattern comprising the cross-track position and the in-track position of said web;

generating signals representing sensed edge pattern data;

storing a baseline of said sensed edge pattern data;

compensating successively-sensed cross-track position data according to the baseline cross-track position data;

storing said compensated successively-sensed edge pattern data;

calculating web drift information from said compensated successively-sensed edge pattern data;

extrapolating said drift information to a predicted web cross-track position at a future web in-track position;

correcting the cross-track alignment of said web in the event that said predicted web cross-track position exceeds a predetermined allowed limit value, said correction of the cross-track alignment of said web being implemented in advance of said future in-track position, said correction further including the steps of:

deriving a new steering control value substantially equal to and having a reversed direction from the control value used in a most recent correction in the event said most recent correction was unidirectional;

deriving a new steering control value substantially equal to said most recently used control value increased by an optimal amount in the event said most recent steering event was not unidirectional;

calculating elapsed web in-track travel from the most recent correction;

decreasing said new control value in the event said elapsed travel is less than a predetermined amount; and implementing said new control value.

17. The method of claim 16 and wherein said compensation step further comprises the step of calculating the difference between a value of said successively-sensed cross-track position data and a corresponding value of said baseline cross-track position data.

18. The method of claim 16 wherein said correction step further comprises the step of repositioning a steering member directing said web so as to effect cross-track movement of said web.

19. The method of claim 16, wherein said operations include the steps of:

imaging a plurality of image frames upon said web; and transferring said images to another member in register;

wherein said correction step further comprises the step of inhibiting said imaging and transfer of images whereby a degradation of said images is prevented and accurate registration of said images is maintained.

20. A method for controlling operations upon a web moving along a path, the web being subject to lateral movement in a direction transverse to the direction of movement of said web along said path, said method comprising the steps of:

(a) monitoring the lateral position of the web and generating signals in response thereto;

(b) determining, in response to said signals, if an operation can be performed upon said web without imposing a correction to lateral web movement; and (c) in response to a determination that the operation cannot be performed, inhibiting the operation until a determination is made that the operation can be performed.

21. The method of claim 20 and wherein said operation step comprises the steps of imaging a plurality of image frames upon said web and transferring a corresponding plurality of image frames formed on said web to another member.

22. The method of claim 20 or 21 and including the step of imposing a lateral correction to said web in response to a determination that the operation cannot be performed.

23. The method of claim 22 wherein said web has a charge thereon and said operations comprise the steps of imagewise exposing said web to modulate said charge; developing said modulated charge to produce developed images; and transferring said developed images to one or more receiver members.

24. Apparatus for controlling operations upon a web comprising:

means for moving the web along a path, the web being subject to lateral movement in a direction transverse to the direction of movement of said web along said path;

means for monitoring the lateral position of the web and generating first signals in response thereto;

means responsive to said first signals for generating second signals relative to a prediction that the transition of the web's lateral alignment beyond a predetermined allowable limit will occur during a time period or web length required for an operation;

means for determining, in response to said signals, if an operation can be performed upon said web without imposing a correction to lateral web movement; and means for imposing said correction in response to a determination that the operation cannot be performed.

25. The apparatus of claim 24 wherein said correction means further comprises a steering member directing said web so as to effect a change in the lateral movement of said web, and wherein said correction is made in advance of said operation.

26. The apparatus of claim 25 further comprising means for imaging a plurality of image frames upon said web and means for transferring a corresponding plurality of said image frames in registered, superposed fashion upon a record member.

27. The apparatus of claim 25 further comprising means for imaging a plurality of image frames upon said web and means for transferring a corresponding plurality of said image frames in registered, superposed fashion upon a corresponding plurality of members.

28. The apparatus of claims 26 or 27 further comprising means for inhibiting imaging of said plurality of image frames upon said web, whereby there is reduced the misregistration between corresponding portions of the subsequent image frames.

29. The apparatus of claim 26 or 27 and wherein said image frames represent color separation images of a multicolor image.

30. The apparatus of claims 26 or 27 further comprising means for developing the respective transferred images with toner of respective different colors.

31. Apparatus for controlling operations upon a web comprising:

means for sensing an edge pattern of said web, said edge pattern comprising the cross-track position and the in-track position of said web;

means for generating signals representing sensed edge pattern data;

means for storing a baseline of said sensed edge pattern data;

means for compensating said successively-sensed cross-track position data according to said baseline edge pattern;

means for storing said compensated successively-sensed edge pattern data;

means for calculating web cross-track drift information;

means for extrapolating said cross-track information to a predicted web cross-track position at a future web in-track position; and means for correcting the cross-track alignment of said web in the event that said predicted web cross-track position exceeds a predetermined allowed limit value, said correction of the cross-track alignment of said web being implemented in advance of said future in-track position.

32. The apparatus of claim 31 wherein said correcting means further comprises:

means for deriving a new steering control value substantially equal to and having a reversed direction from the control value used in a most recent correction in the event said most recent correction was unidirectional;

means for deriving a new steering control value substantially equal to said most recently used control value increased by an optimal amount in the event said most recent steering event was not unidirectional;

means for calculating elapsed web in-track travel from said most recent correction;

means for decreasing said new control value in the event said elapsed travel is less than a predetermined amount; and means for implementing said new control value.

33. The apparatus of claim 32, further comprising:

means for imaging a plurality of image frames upon said web; and means for transferring said images to another member in register; and means for inhibiting said imaging and transfer of images, whereby a degradation of said images is prevented and accurate registration of said images is maintained.

34. Apparatus for controlling operations upon a web comprising:

means for moving the web along a path, the web being subject to lateral movement in a direction transverse to the direction of movement of said web along said path;

means for monitoring the lateral position of the web and generating signals in response thereto;

means for determining, in response to said signals, if an operation can be performed upon said web without imposing a correction to lateral web movement;

means for imposing a lateral correction in response to said determination that the operation cannot be performed; and means for inhibiting said operations until a determination is made that the operation can be performed.

35. The apparatus of claims 24 or 34 wherein said operations comprise:

means for imagewise exposing said web to create latent images thereon;

means for developing said latent images; and means for transferring said developed images to at least one receiver member.

36. A method for controlling operations upon a web moving along a path, the web being subject to lateral movement in a direction transverse to the direction of movement of said web along said path, said method comprising the steps of:

calculating a predicted lateral position of the web;

comparing the predicted lateral position with a predetermined limit to determine if the limit will be exceeded during the course of one of said operations; and in response to a determination that the limit will be exceeded, imposing a correction to lateral web movement prior to commencing one or more of the operations.

37. An apparatus for controlling operations upon a web moving along a path, the web being subject to lateral movement in a direction transverse to the direction of movement of said web along said path, comprising means for calculating a predicted lateral position of the web;

means for comparing the predicted lateral position with a predetermined limit to determine if the limit will be exceeded during the course of one of said operations; and means, responsive to a determination that the limit will be exceeded, for imposing a correction to lateral web movement prior to commencing one or more of the operations.

* * * * *